United States Patent
Ina et al.

(10) Patent No.: US 6,446,562 B1
(45) Date of Patent: Sep. 10, 2002

(54) CAR BODY

(75) Inventors: Yoshihiko Ina; Seijiro Todori; Masaki Yono, all of Kudamatsu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/791,811

(22) Filed: Feb. 26, 2001

(51) Int. Cl.[7] .............................................. B61D 17/00
(52) U.S. Cl. ........................ 105/413; 105/397; 105/404
(58) Field of Search ................................. 105/396, 397, 105/401, 404, 409, 412, 413, 422, 410; 52/278, 287.1, 272, 578, 630; 296/191, 197

(56) References Cited

U.S. PATENT DOCUMENTS

| | | | | |
|---|---|---|---|---|
| 2,356,008 | A | * 8/1944 | Schafer | 296/191 |
| 2,970,553 | A | * 2/1961 | Allen | 105/410 |
| 3,354,839 | A | * 11/1967 | Lich et al. | 105/404 |
| 4,794,032 | A | * 12/1988 | Fujii et al. | 105/396 |
| 4,993,329 | A | * 2/1991 | Takeich et al. | 105/396 |
| 5,042,395 | A | * 8/1991 | Wackerle et al. | 105/397 |
| 5,140,913 | A | * 8/1992 | Takeichi et al. | 105/396 |
| 5,383,406 | A | * 1/1995 | Vanolo et al. | 105/397 |
| 5,433,151 | A | * 7/1995 | Ohara et al. | 105/397 |
| 6,219,983 | B1 | * 4/2001 | Grakjaar Jensen et al. | 105/396 |

* cited by examiner

Primary Examiner—S. Joseph Morano
Assistant Examiner—Lars A. Olson
(74) Attorney, Agent, or Firm—Antonelli, Terry, Stout & Kraus, LLP

(57) ABSTRACT

The present invention aims to manufacture a car body with ease.

A hollow material 10 comprises the lower portion of a side structure 201 of the car body. A face plate 11 of the hollow material 10 at the external side of the car has a lower end which projects further downward than a face plate 12 at the internal side of the car. The lower ends of the face plates 11, 12 are connected by a rib 13. The hollow portion thus formed is triangular in shape. A rib 14 above the rib 13 is formed horizontally. The face plates 11, 12 and a rib 15 positioned above the rib 14 are eliminated from the region of one or more doorways 220. The lower end of the doorway 220 of the side structure 201 is equipped with the hollow portion, so that it stays strong against transfer of the side structure. A hollow-shaped material 110, which comprises the end portion of an underframe 203, has an end portion in the width direction which forms a slope (rib 114) facing towards the upper side of the external side of the car. Therefore, welding W1, W2 are made simple.

4 Claims, 3 Drawing Sheets

10: hollow-shaped material
11, 12: face plate
13, 14, 15, 16: rib
110: hollow-shaped material
111: side sill
111b, 111c: hollow portion
113b, 113c: face plate
114, 115, 116: rib 10: hollow-shaped material
11, 12: face plate
13, 14, 15, 16: rib
110: hollow-shaped material
111: side sill
111b, 111c: hollow portion
113b, 113c: face plate
114, 115, 116: rib

CAR BODY

FIELD OF THE INVENTION

The present invention relates to a structure of a car body which runs on a track.

DESCRIPTION OF THE RELATED ART

A car body is comprised of side structures, a roof, an underframe constituting the floor, and ends constituting the end portions in the longitudinal direction. The side structures, the roof, and the underframe are constituted by bonding plural extruded materials together. The longitudinal directions of the extruded materials are positioned toward the longitudinal direction of the car body. A large proportion of the extruded materials are hollow-shaped materials. Especially, the underframe is made from hollow-shaped materials. This technique is disclosed in Japanese Patent Laid-Open No. 09-309164 (EP 0797043A2).

The process starts with producing the side structures, the roof, the underframe and the ends first, and then assembling the components to obtain a car body. The side structures are formed with one or more doorways and windows. Therefore, extruded materials provided with notches for the doorways and the windows are juxtaposed and bonded to obtain the side structure.

SUMMARY OF THE INVENTION

The doorways are formed on the side structure. The doorway is large both in height and width. Particularly, the width of the doorway in a commuter train is large.

Therefore, in a case where the produced side structure provided with the doorways is transferred to an assembling process, the side structure tends to deform at the region with the doorways. Also, when the side structure is produced using hollow-shaped materials, the upper surfaces are bonded first, and further bonding is performed by turning the side structure upside down. In such case, the side structure tends to deform at the region with the doorways.

Therefore, the car body must be produced with extra care, causing troublesomeness.

The object of the present invention is to provide a car body that could be produced with ease.

The above-mentioned objects could be achieved by manufacturing a side structure, wherein:

- a second hollow-shaped material is bonded to lower ends of a plurality of first hollow-shaped materials;
- the lower end portion of the second hollow-shaped material is formed so that a face plate at the external side of a car has a lower end portion which projects further downward than a lower end portion of a face plate at the internal side of the car;
- the lower end portions of the two face plates are connected with a first rib;
- the lower end portion of the face plate at the internal side of a car and the face plate at the external side of a car are connected with a second rib; and
- members of the second hollow-shaped material positioned above the second rib are removed from said material at one or more doorways.

DETAILED DESCRIPTION OF PREFERRED EMBODIMENTS

Figure 1:
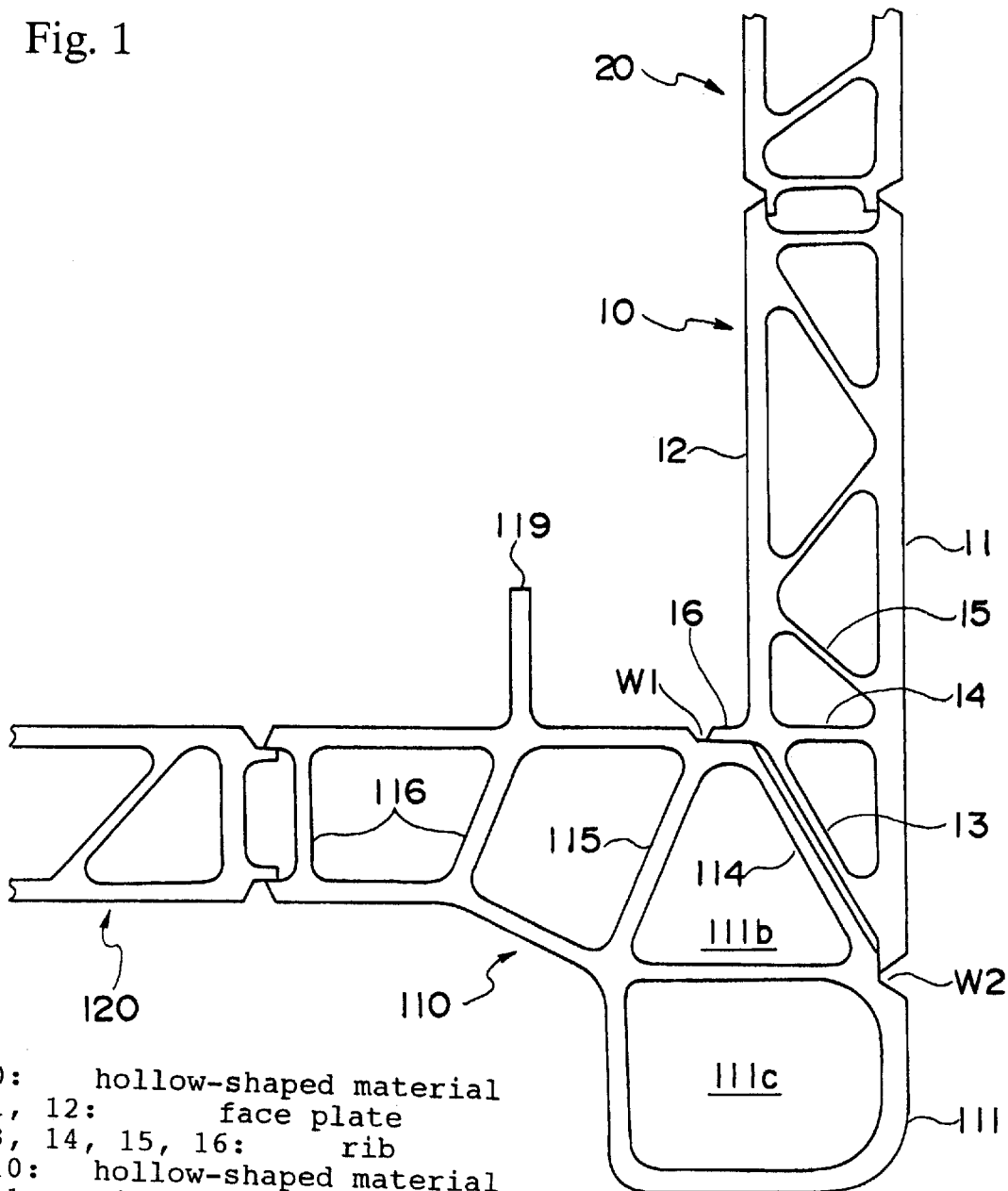
FIG. 1 is a longitudinal cross-sectional view of the bonding region between the side structure and the underframe according to an embodiment of the present invention.
Figure 2:
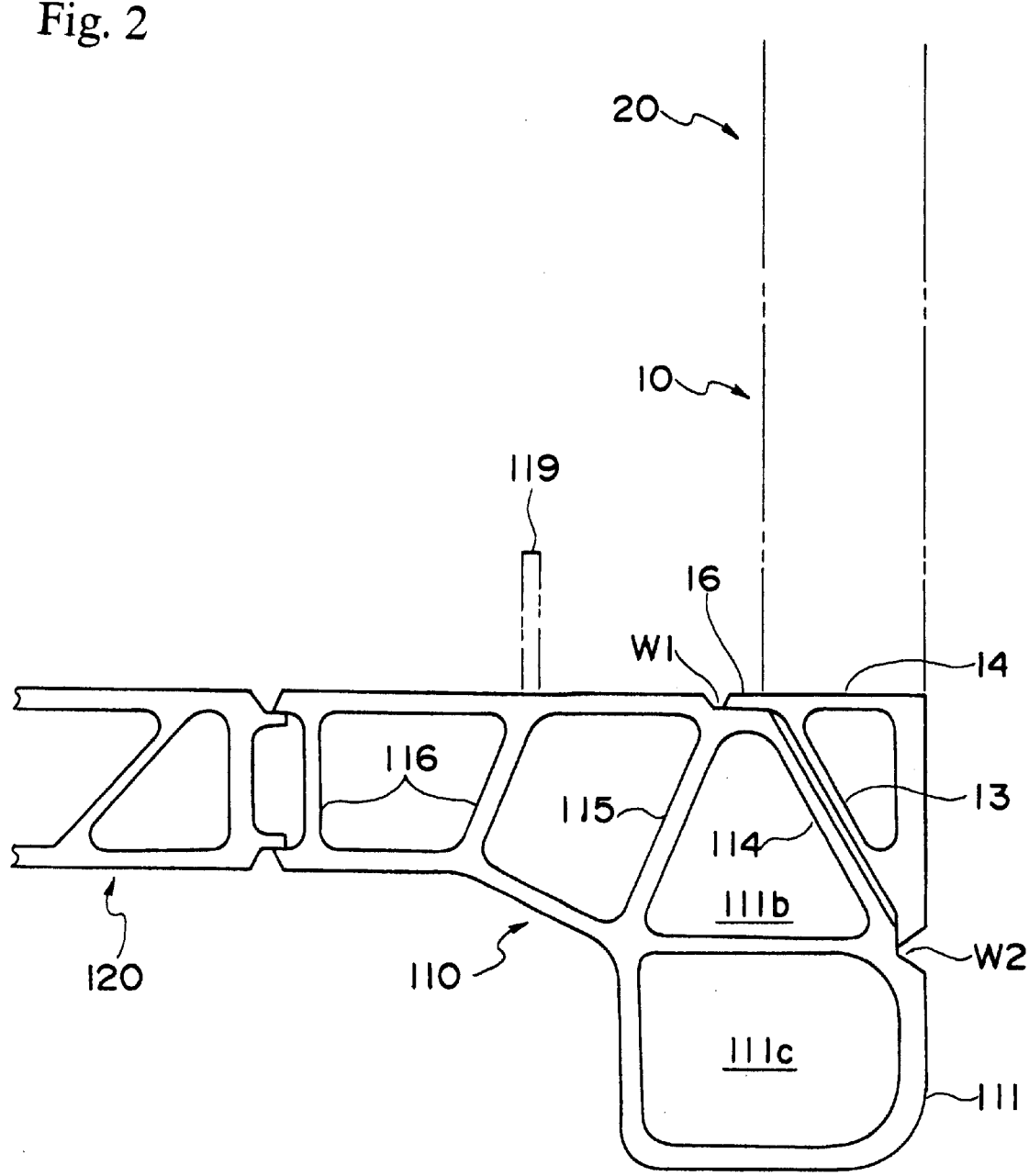
FIG. 2 is a longitudinal cross-sectional view of the bonding region between the side structure and the underframe at the doorway region, according to an embodiment of the present invention.
Figure 3:
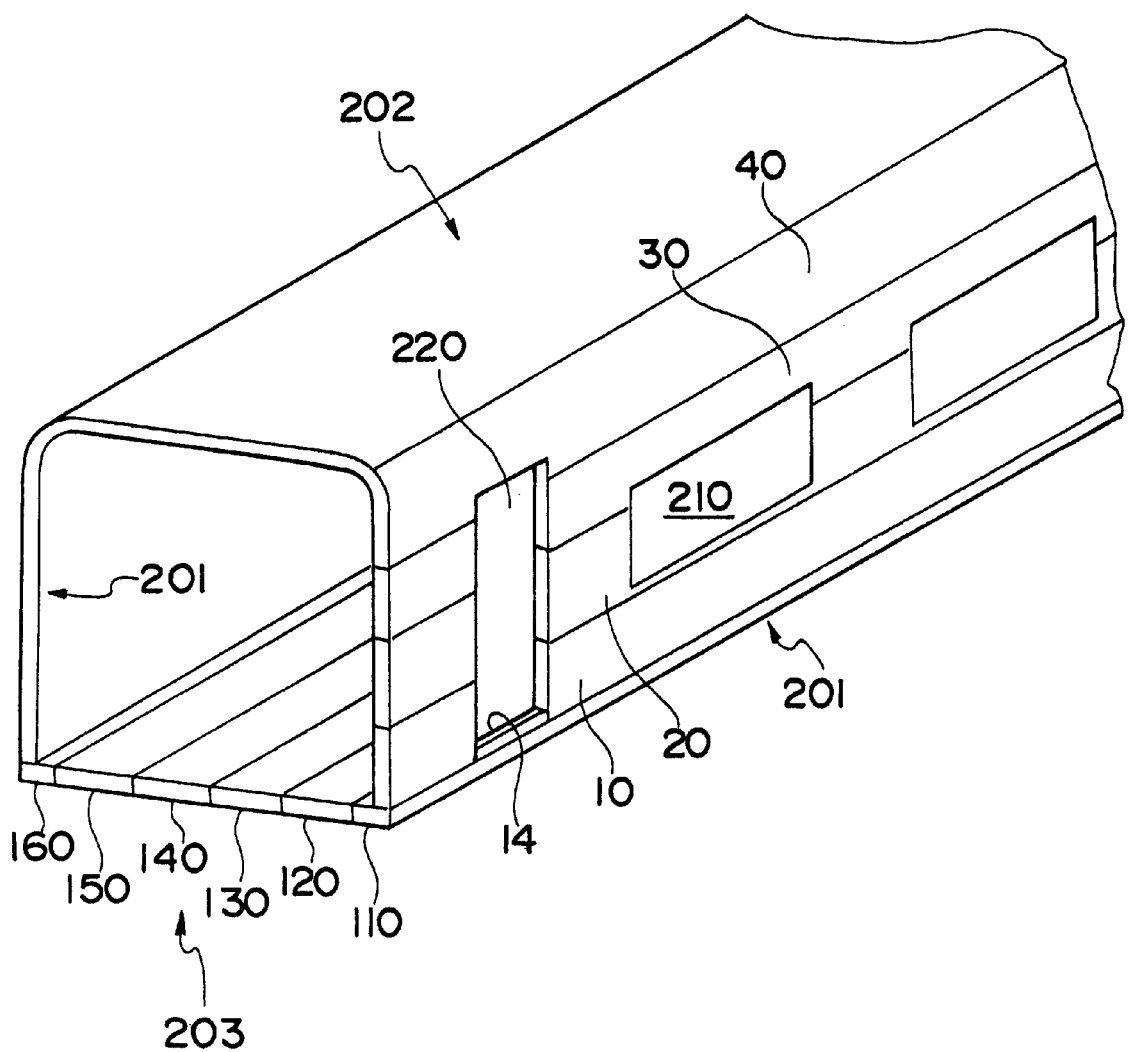
FIG. 3 is a side view of the car body according to an embodiment of the present invention.

A preferred embodiment of the present invention will now be explained referring to FIG. 1 through FIG. 3. A car body of a railway car is comprised of side structures 201, a roof 202, an underframe 203 constituting the floor, and ends constituting the end portions in the longitudinal direction. The side structures 201, the roof 202 and the underframe 203 are constituted by bonding plural extruded materials made of aluminum alloy together. The longitudinal directions of the extruded materials are positioned toward the longitudinal direction of the car body. The extruded materials are hollow-shaped materials.

The side structure 201 is constituted by bonding hollow-shaped materials 10, 20, 30, 40 together by welding and the like. Generally, the side structure 201 is constituted from many more hollow-shaped materials. The hollow-shaped materials 10, 20, 30, 40 have its longitudinal directions positioned toward the longitudinal direction of the car body. The side structure is provided with one or more windows 210 and one or more doorways 220. The hollow-shaped materials 10, 40 at the region of the doorway 220 are notched out. The hollow-shaped materials 20, 30 at the same region are cut away at part of the way. The hollow-shaped materials 10, 20, 30, 40 are bonded together in one body. The hollow-shaped material 10 is the member to be bonded with the underframe 203.

The underframe 203 is constituted by bonding hollow-shaped materials 110, 120, 130, 140, 150, 160 together by welding and the like. The hollow-shaped materials 110, 120, 130, 140, 150, 160 have its longitudinal direction positioned toward the longitudinal direction of the car body. The hollow-shaped materials 110, 160 constituting the end portions are them embers to be bonded with the hollow-shaped material 10 of the side structure 201. The hollow-shaped materials 110, 160 are called side sills, being thick in plate thickness and tall in height. The upper surfaces of the hollow-shaped materials 110, 160 are in the same level with the other hollow-shaped materials 120, 130, 140, 150. The lower surfaces of the end portions in the width direction of the hollow-shaped materials 110, 160 projects further downward than the lower surfaces of the other hollow-shaped materials.

The hollow-shaped materials 10 through 40, and 110 through 160 have their two face plates bonded together by truss-like ribs. The bonding regions between the hollow-shaped materials constitute joints in order to facilitate bonding.

The bonding region between the hollow-shaped material 10 and the hollow-shaped material 110 (the same applies to the hollow-shaped material 160) will be explained. The end portion side of the hollow-shaped material 110 in the width direction is thickened so as to constitute a side sill 111. The side sill 111 is comprised of two hollow portions 111b, 111c provided one on top of the other. The side adjacent to the other hollow-shaped material is constituted from two face plates 113b, 113c, and a plurality of ribs 114, 115, 116 connecting the two. The ribs 114, 115 are provided substantially in a truss. The face plates 113b, 113c are connected to the upper hollow portion 111b. The end portion of the hollow-shaped material 110 on the hollow-shaped material 120 side constitutes a joint for connecting with the hollow-shaped material 120.

The upper hollow portion 111b of the side sill 111 is comprised of ribs 114, 115, and a rib dividing the upper and lower hollow portions. The hollow portion 111b is substantially in triangular shape. The rib 114 is an inclined plane facing the upper surface towards the external side of the car. The rib 114 is substantially parallel to the rib 13. The ribs 114, 13 are concaved in the middle.

The vicinity of the apex of the triangle 111b is provided at substantially the same position as the face plate 113b. The vicinity of the apex at the side near the external side of the car is more concaved than the upper surface of the face plate 113b. Therefore, when combined with the lower end portion of the hollow-shaped material 10, the side surfaces of the two are bonded smoothly.

The upper hollow portion 113b side of the connecting region between the upper hollow portion 111b and the lower hollow portion 113c of the side sill 111 is concaved. Therefore, when combined with the face plate 11 of the hollow-shaped material 10, the external surface of the face plate 11 and the lower hollow portion 111c are bonded smoothly.

The reference number 119 denotes a seat for fixing the interior materials for the wall of the side structure 201.

The hollow-shaped material 10 at the lower end of the side structure 201 is comprised of two face plates 11, 12, and a plurality of ribs 13, 14, 15 for connecting the two. At the lower end portion of the hollow-shaped material 10, the lower end of the face plate 11 at the external side of the car projects further downward than the face plate 12 at the internal side of the car. The lower end portion of the face plate 11 and the lower end portion of the face plate 12 are connected by the rib 13. Therefore, the rib is inclined towards the upper direction of the internal side of the car. The rib 14 adjacent above the rib 13 is arranged substantially horizontally. The plurality of ribs 15 is arranged substantially in a truss. The upper end portion of the hollow-shaped material 10 constitutes a connecting region with the hollow-shaped material 20.

The horizontal rib 14 is positioned slightly lower than the height of the floor of the car. At the region for the doorway 220, the face plates 11, 12 and the ribs 15 positioned above the rib 14 are cut and removed therefrom. The rib 119 at the region for the doorway 220 is cut and removed therefrom.

The notched hollow-shaped material 10 thus constituted is bonded so as to manufacture the side structure 201. Because the doorway 220 is opened widely, the side structure 201 tends to deform when turning the structure upside down after completing bonding of the upper surface, or when transferring the same for bonding with the underframe 203. However, there is provided a hollow portion comprised of ribs 13, 14 and the face plate 11 to the lower end of the doorway 220. There are no members of the hollow-shaped material 10 above the hollow portion. The hollow-shaped material 10 at both side of the doorway is connected by the hollow portion. Therefore, deformation could be inhibited, compared to the cases where no hollow portion exists or where the members are connected by a flat plate.

Next, the side structure 201 is bonded to the underframe 203. On the extension of the horizontal rib 14, there exists a rib 16 projecting from the face plate 12 towards the internal side of the car. The rib 16 overlaps the upper concave portion of the hollow portion 111b. The lower end of the face plate 11 of the hollow-shaped material 10 overlaps the concave portion of the side surface of the hollow-shaped material 110. Each overlap is bonded by ark welding, respectively. The welding W1 of the overlap at the side surface is performed from external side of the car. The welding W2 of the overlap at the upper side is performed from internal side of the car. Because the hollow portion at the lower end of the hollow-shaped material is in triangular shape, the welding of the bonding region with the hollow-shaped material 110 could be performed with ease, compared to the case where the hollow portion is in square shape.

The horizontal rib 16 projects toward the internal side of the car. Therefore, the rib 16 becomes the supporting seat during assembling of the side structure 201 and the underframe 203, enabling accurate assembly and simplified welding.

Moreover, the hollow-shaped materials 10, 110 are constituted so as to overlap at slopes (ribs 13, 114), so that the hollow-shaped materials 10, 110 could be formed in a truss by setting the base on the bonding region W1, W2 between the two.

In the above-mentioned embodiment, the rib 114 at the end portion of the hollow-shaped material 110 may be eliminated.

The technical scope of the present invention is not limited to the terms used in the claims or in the summary of the present invention, but is extended to the range in which a person skilled in the art could easily substitute based on the present disclosure.

The present invention formed the lower end of the side structure in a hollow triangle, thereby obtaining strong external structure, so that deformation at the doorway region during turnover of the side structure or during transfer could be prevented. Moreover, bonding is made simple even in the case where the side structure is assembled with the underframe and bonded accordingly.

We claim:

1. A car body comprising two side structures, a roof structure and an underframe, wherein:

a lower end portion of a first hollow-shaped material constituting a lower end portion of said side structure is formed so that a face plate at the external side of said car has a lower end portion which projects further downward than a lower end portion of a face plate at the internal side of said car;

said lower end portions of said two face plates are connected with an inclined first rib;

said lower end portion of said face plate at the internal side of said car is connected to said face plate at the external side of said car with a substantially horizontal second rib;

members of said first hollow-shaped material positioned above said second rib are removed therefrom at one or more doorways;

said car body includes a fourth rib projecting toward the internal side of said car at the vicinity of an upper end of said first rib;

said fourth rib is bonded to a leading end of a second hollow-shaped material constituting the underframe;

said lower end portions of the two face plates of said first hollow-shaped material are respectively bonded to the second hollow-shaped material; and said second hollow-shaped material includes a third rib substantially parallel to the inclined first rib.

2. A car body according to claim 1, wherein an end portion side of the second hollow-shaped material is thickened as compared to a remainder of the second hollow-shaped material.

3. A car body according to claim 2, wherein said end portion side of the second hollow-shaped material includes a first, upper portion and a second, lower portion, the first, upper portion having substantially a triangular shape.

4. A car body according to claim 3 wherein the first, upper portion, and the second, lower portion, of the second hollow-shaped material have a substantially horizontal fifth rib therebetween.

* * * * *